(12) United States Patent
Reiner et al.

(10) Patent No.: US 8,972,361 B1
(45) Date of Patent: Mar. 3, 2015

(54) PROVIDING SYSTEM MANAGEMENT SERVICES

(75) Inventors: David S. Reiner, Lexington, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 359 days.

(21) Appl. No.: 13/166,128

(22) Filed: Jun. 22, 2011

(51) Int. Cl.
*G06F 17/30* (2006.01)

(52) U.S. Cl.
USPC .......................................................... 707/694

(58) Field of Classification Search
USPC .......................................................... 707/694
See application file for complete search history.

(56) References Cited

U.S. PATENT DOCUMENTS

| | | | |
|---|---|---|---|
| 6,233,449 B1 * | 5/2001 | Glitho et al. | 455/423 |
| 2012/0102225 A1 * | 4/2012 | Bhardwaj et al. | 709/241 |

* cited by examiner

*Primary Examiner* — Baoquoc N To
(74) *Attorney, Agent, or Firm* — Krishnendu Gupta; Jason A. Reyes

(57) ABSTRACT

Methods and systems for use in providing system management services are disclosed. In at least one embodiment, a method and system may comprise receiving a management operation request at a recommendation service. Based on the management operation request and recommendation control policies, management operation recommendations associated with an information management system are determined.

In at least one embodiment, a method and system may comprise receiving information associated with an information management system at a learning service. Based on the information, dimensions of a situational state space characterizing operating conditions of the information management system are determined. Best practices for at least one state of the situational state space are determined.

18 Claims, 12 Drawing Sheets

PROVIDING SYSTEM MANAGEMENT SERVICES

RELATED APPLICATIONS

This application is related to co-pending U.S. patent application Ser. No. 12/639,668 for DATA STORAGE SYSTEMS HAVING ASSOCIATED SITUATIONAL ANALYSIS FRAMEWORK FOR AUTOMATIC RESPONSE TO MOVEMENT IN A STATE SPACE, and co-pending U.S. patent application Ser. No. 13/071,926 for MANAGING INFORMATION MANAGEMENT SYSTEMS, both of which are hereby incorporated by reference herein.

FIELD OF THE INVENTION

The present invention relates to providing system management services.

BACKGROUND

A wide variety of different types of data storage systems are known, including, by way of example, tiered storage systems, cloud storage systems and storage systems of virtual data centers. These and other data storage systems typically comprise one or more sets of storage devices, also referred to as storage arrays.

Enterprise application users and other users generally want to achieve targeted performance levels and predictability from their data storage systems. However, under certain conditions these goals can be difficult to achieve in practice. For example, data storage systems are typically designed to include one or more tuning mechanisms that allow administrators to make adjustments to storage policies, parameters, thresholds, configurations, algorithms, and other characteristics of system operation. Similarly, administrators are able to initiate and complete various application-specific storage management operations that may interact with and affect their data storage systems. Although these low-level tuning mechanisms and management operations can be very helpful to an administrator, they can also present a challenge to administrators in terms of understanding the impact of various choices and the interactions among the various choices as situations change over time. The result is that choices may be avoided, or made arbitrarily, or without sufficient knowledge of the likely effects. Unfortunately, this can lead to suboptimal or unpredictable system performance.

Administrators therefore have to become experts at setting policies and determining management operations best practices. Nonetheless, it remains difficult to adjust effectively to changing workloads, missed performance targets, fluctuating performance, and sudden demands on system resources, and total cost of operation increases significantly due to the expertise and attention required of administrative personnel.

SUMMARY OF THE INVENTION

Methods and systems for use in providing system management services are disclosed. In at least one embodiment, a method and system may comprise receiving a management operation request at a recommendation service. Based on the management operation request and recommendation control policies, management operation recommendations associated with an information management system are determined.

In at least one embodiment, a method and system may comprise receiving information associated with an information management system at a learning service. Based on the information, dimensions of a situational state space characterizing operating conditions of the information management system are determined. Best practices for at least one state of the situational state space are determined.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Described below are techniques for use in providing system management services. In some embodiments in accordance with the current technique, a framework is provided that automatically identifies and deploys optimal policy sets and management operations best practices as the state of an information management system changes.

In at least one embodiment, all or part of the framework may be provided as a service to one or more client systems. The service may take advantage of multiple data sets to help the service determine optimal policy sets and management operations best practices as well as management operation recommendations. Some embodiments may also provide a rationale underlying determinations of the service to users of the client systems.

Figure 1:
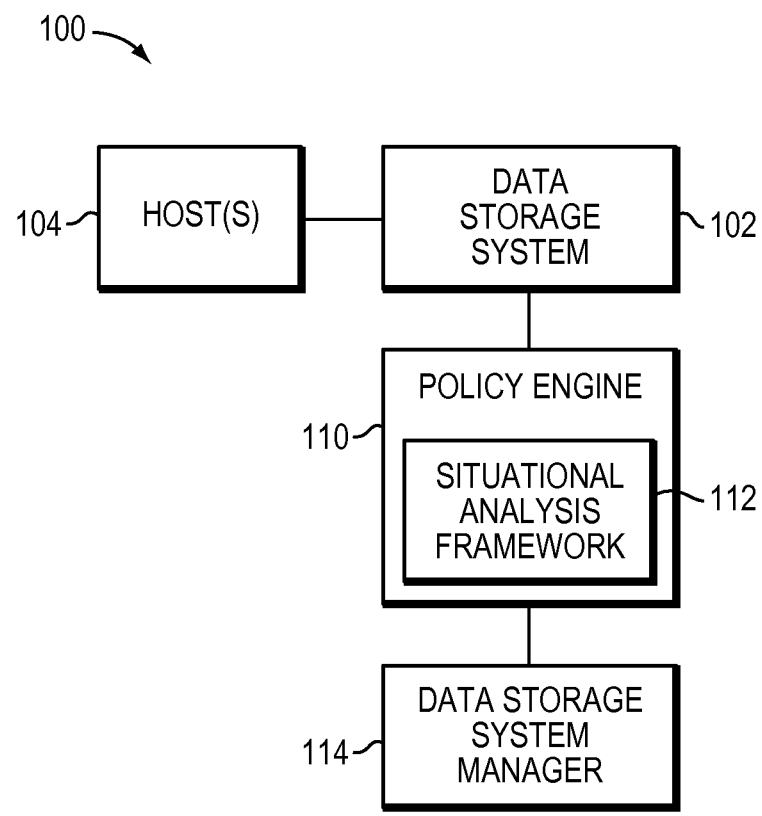
FIG. 1 illustrates a block diagram showing an example of an information management system that may be used with an embodiment of the technique herein.

FIG. 1 shows an example of an information management system 100 which includes a data storage system 102, one or more hosts 104, and a policy engine 110 that incorporates a situational analysis framework (SAF) 112. The policy engine 110 is coupled between the data storage system 102 and a data storage system manager 114. The SAF 112 of the policy engine 110 is used to provide an automatic response to changing situations in the information management system 100, as will be described in greater detail below.

Although the policy engine 110 is shown as being external to the data storage system 102 in the present embodiment, in other embodiments the policy engine may be internal to the data storage system. Examples of such embodiments will be described below in conjunction with FIGS. 3A and 3B.

The data storage system 102 may comprise, for example, a single-site storage system comprising one or more storage arrays, servers, or other components. Alternatively, the system may comprise a distributed storage system comprising storage arrays, servers or other components not located at a single site but accessible via a network such as the Internet. The latter type of arrangement may be implemented as a so-called "cloud" storage system. A particular storage array, server or other component of the system 102 may thus be implemented as a computer or other stand-alone processing platform, or may be distributed over one or more processing platforms each comprising one or more separate computers.

Numerous other arrangements of storage arrays, servers or other components are possible in the data storage system 102. Such components can communicate with other elements of the information management system 100 over any type of network, such as a wide area network (WAN), a local area network (LAN), a satellite network, a telephone or cable network, or various portions or combinations of these and other types of networks.

The SAF 112 typically runs on a computer or other processing platform, which may be viewed as an example of what is more generally referred to herein as a "processing device." Such a device generally comprises at least one processor and an associated memory, and implements functional modules for controlling some aspects of the data storage system 102.

It is to be appreciated that a given embodiment of the system 100 may include multiple instances of data storage system 102, policy engine 110, SAF 112, and manager 114, although only single instances of such components are shown in the simplified system diagram 100 for clarity of illustration.

Figure 2:
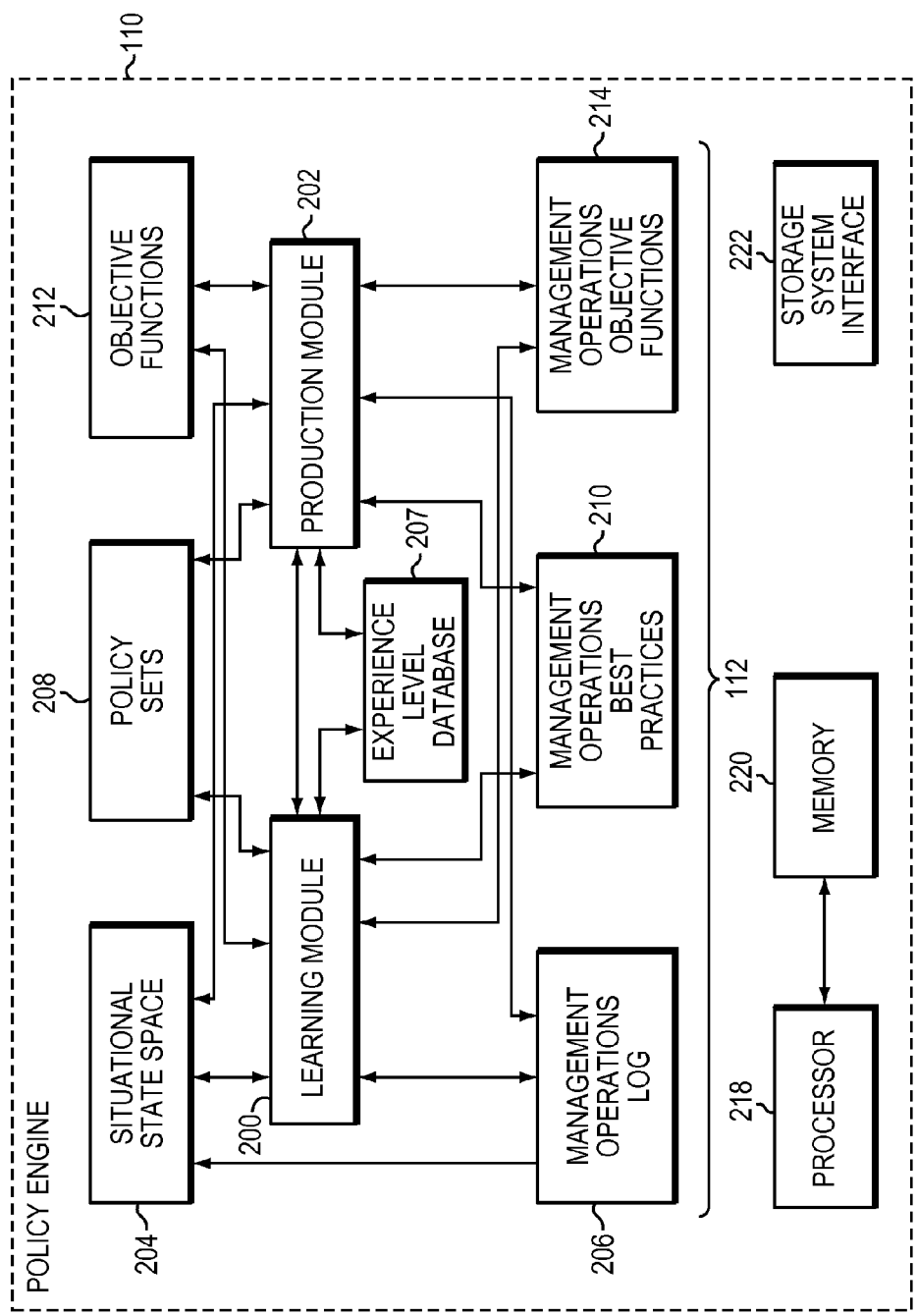
FIG. 2 illustrates a policy engine comprising a situational analysis framework that may be used with an embodiment of the technique herein.

FIG. 2 shows a more detailed view of the policy engine 110 in an illustrative embodiment of the current technique. The SAF 112 of the policy engine 110 in this embodiment comprises a learning module 200 coupled to a production module 202. Other components of the SAF 112 may include situational state space 204, policy sets 208, objective functions 212, management operations log 206, management operations best practices 210, management operations objective functions 214, and user experience level database 207. The operations of the learning module 200 and production module 202 will be described below in conjunction with FIGS. 4A, 4B, 6A and 6B. The learning module 200 and the production module 202 both can access the situational state space 204, policy sets 208, objective functions 212, management operations log 206, management operations best practices 210, user experience level database 207, and management operations objective functions 214. The policy engine 110 may interface with the data storage system 102 and the data storage system manager 114 via the storage system interface 222, which may be implemented as application programming interfaces (APIs).

The policy engine 110 in this embodiment further comprises a processor 218 coupled to a memory 220. The processor 218 may comprise a microprocessor, a microcontroller, an application-specific integrated circuit (ASIC), a field programmable gate array (FPGA) or other type of processing circuitry, as well as portions or combinations of such circuitry elements. The learning and production modules 200 and 202 of the policy engine 110 may be implemented in whole or in part in the form of one or more software programs stored in memory 220 and executed by processor 218.

The memory 220 may be viewed as an example of what is more generally referred to herein as a "computer program product" having executable computer program code embodied therein. Such memories may comprise electronic memories such as random access memory (RAM), read-only memory (ROM) or other types of memory, in any combination. The computer program code when executed in a processing device implementing the SAF 112 causes the device to perform corresponding operations associated with functions such as automatic policy or best practices selection for controlling operation of the information management system 100. Similarly, computer program code may be used to implement other functionality associated with the policy engine 110, such as carrying out policies or best practices selected by the SAF 112. One skilled in the art would be readily able to implement such software given the teachings provided herein. Other examples of computer program products embodying aspects of the invention may include, for example, optical or magnetic disks.

It should be noted that the policy engine 110 may comprise more than one of each of the components specifically shown in FIG. 2 and other modules or components in addition to those specifically shown in FIG. 2. For example, conventional modules of a type known to those skilled in the art may be incorporated into the policy engine. It should also be noted that in some embodiments functionalities and data provided by the modules and components shown in policy engine 110 may be provided by other modules shown or not shown in FIG. 2. For instance, in at least one embodiment, the functionalities and/or data provided by management operations log 206, management operations best practices 210, and management operations objective functions 214, may be encompassed by situational state space 204, policy sets 208, and objective functions 212, respectively. In another embodiment, the content and functionality of situational state space 204, policy sets 208, and objective functions 212 may be determined by an analysis of operations log 206, management operations best practices 210, and management operations objective functions 214 by learning module 200.

Figure 3A:
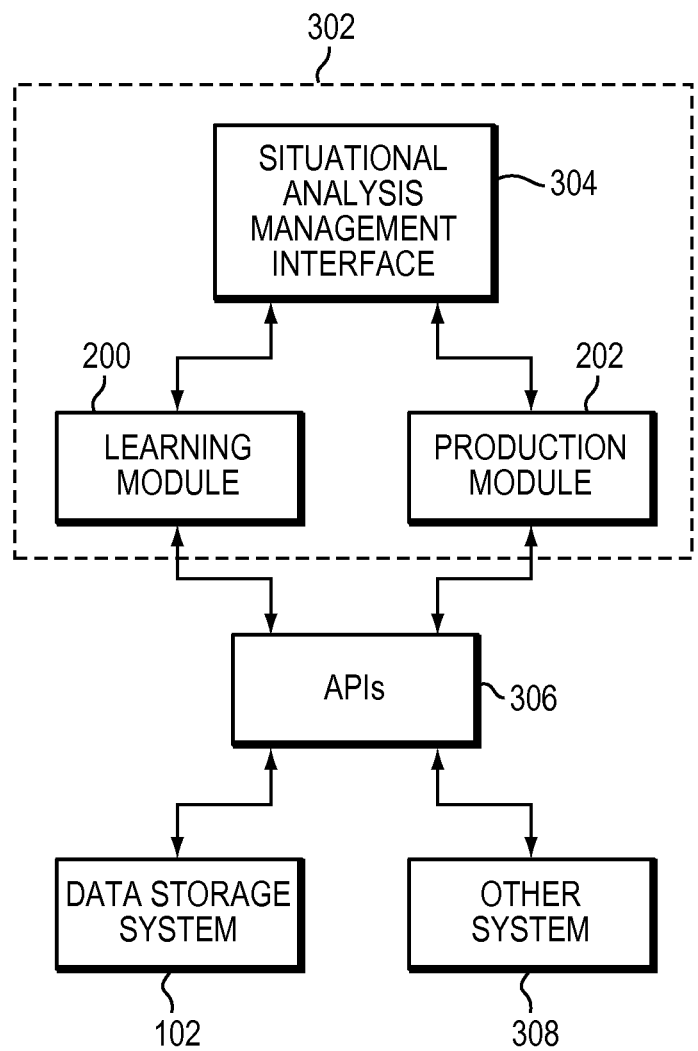
FIG. 3A and FIG. 3B each illustrate an example placement of components of a situational analysis framework that may be used with an embodiment of the technique herein.
Figure 3B:
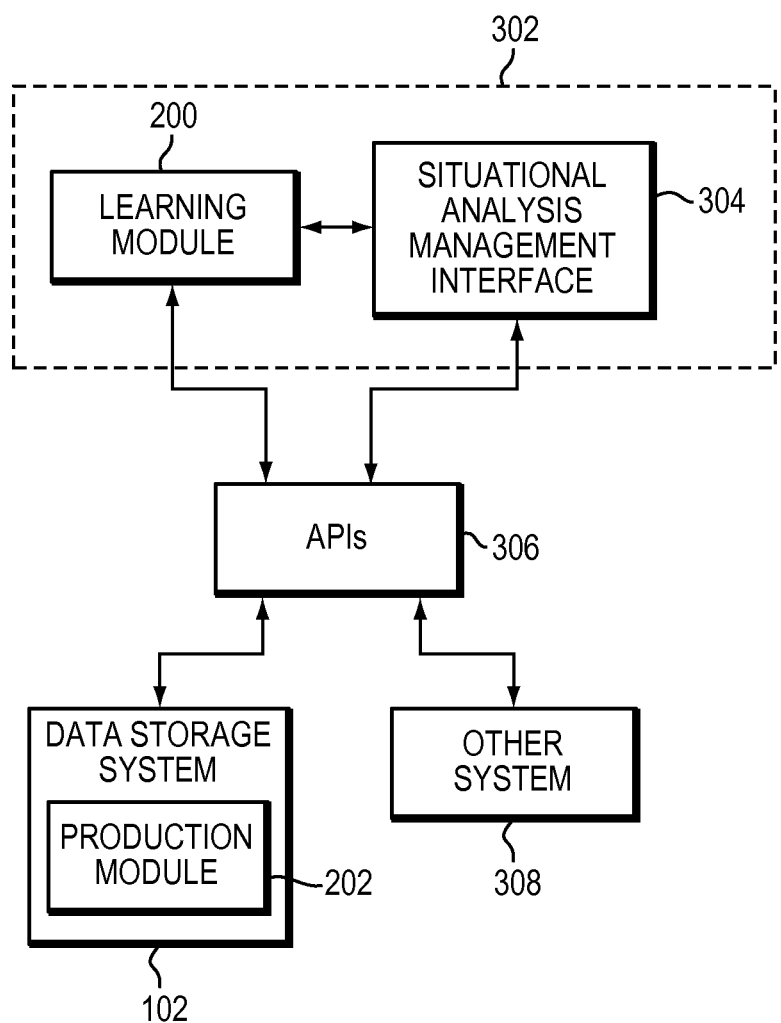

Although the SAF 112 in the present embodiment is illustratively shown as being implemented within the policy engine 110 of the data storage system 102, as shown in FIG. 1 and FIG. 2, in other embodiments it could instead be implemented outside of the policy engine, in another system, system component, or environment, or distributed across multiple systems or system components. In an example embodiment of the current technique, all or a portion of the SAF 112 may be implemented in one of the hosts 104, or in the data storage system manager 114. In another example embodiment, as shown in FIG. 3A, the modules and components of SAF 112, such as learning module 200 and production module 202, may be entirely located in an environment 302 outside of associated data storage system 102. Alternatively, as shown in FIG. 3B, the modules and components of SAF 112 may be separately located, e.g., learning module 200 can be located in environment 302 and production module 202 can be located in data storage system 102. In other embodiments, both the data storage system 102 and environment 302 may each include a learning module or a production module or both a learning module and a production module.

The modules and components of SAF 112, the data storage system 102, and the other systems 308 may communicate using application programming interfaces (APIs) 306. In one embodiment it may be possible to obtain metrics through APIs 306 from other systems 308. These metrics may be used to determine values of SAF dimensions, or as part of the SAF objective function. For example, the other system may be an end-user application system such as SAP. This enables SAF to look beyond the immediate environment (i.e. the data storage system) for clues on system state, such as whether SAP transactions have good response time. A further embodiment may also provide a situational analysis management interface 304 that allows an administrator to manage the SAF 112. As mentioned above, communication may be over any type of network, such as a WAN, a LAN, a satellite network, a telephone or cable network, or various portions or combinations of these and other types of networks. For example, environment 302, which may contain part or all of SAF 112, may provide the functionalities of the learning module 200 or the production module 202 or both the learning module 200 and the production module 202 to data storage system 102 and other systems 308 as a service over the Internet, as described further below.

Figure 4A:
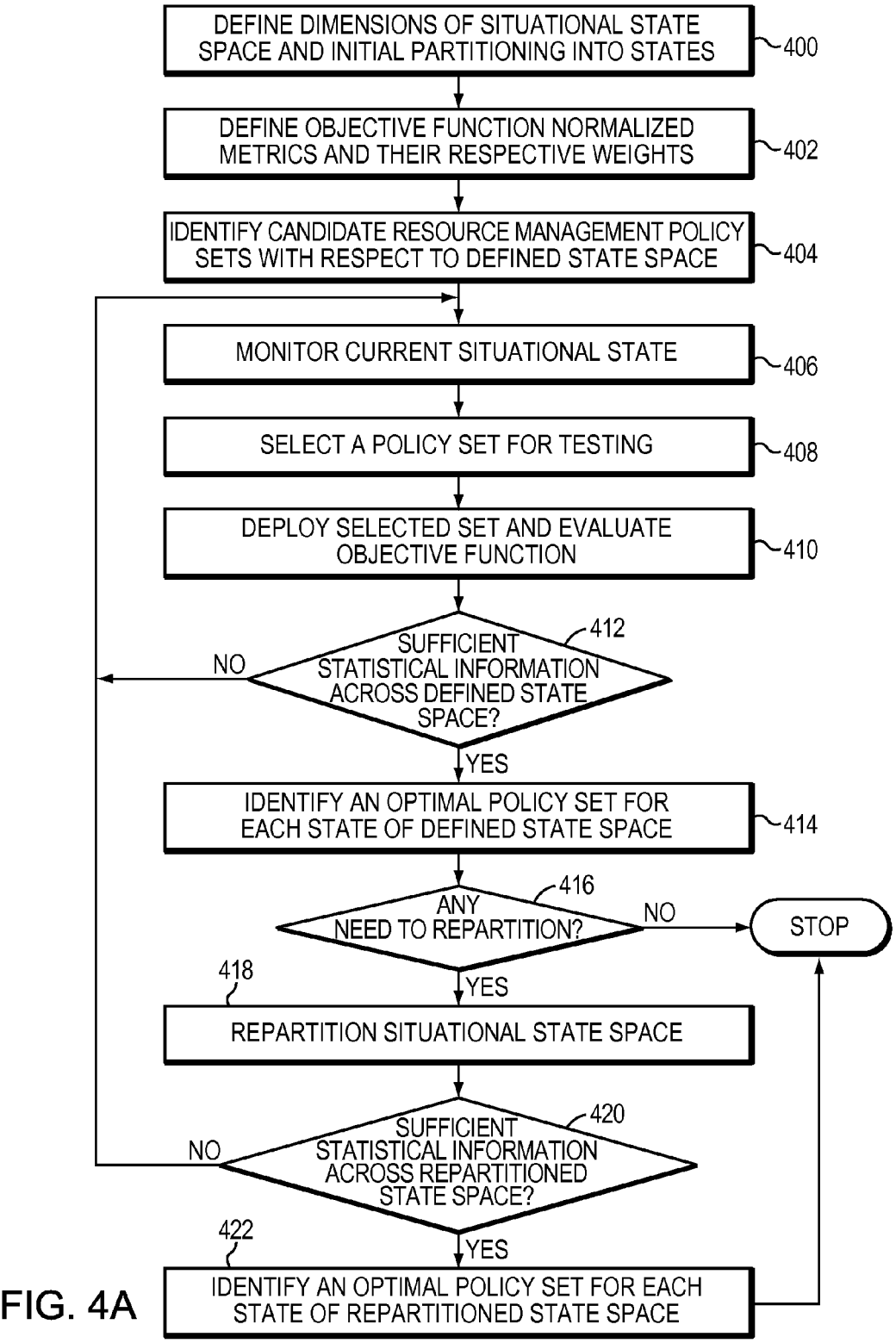
FIG. 4A, FIG. 4B, FIG. 6A and FIG. 6B illustrate flow diagrams that may be used with an embodiment of the technique herein.

Referring now to FIG. 4A, shown is a flow diagram illustrating how the learning module 200 of the SAF 112 can be used to identify optimal storage policies in at least one embodiment. In step 400, the dimensions of a situational state space can be defined, including an initial partitioning of the state space into states. The dimensions of the situational state space in an illustrative embodiment may comprise two or more dimensions selected from at least one dimension category. Examples of possible dimension categories include load, performance, time, user level of expertise, user role, user permissions, and event state. In an example embodiment, information pertaining to the situational state space, including, for example, the dimensions of the situational state space and the partitioning of the situational state space, can be located in the situational state space component 204.

In at least one embodiment, users may be associated with one or more levels of expertise, which may, in some cases, be represented as at least part of an event state. For example, a user may be a novice, generalist, or an expert user of a particular system or application. For each application or system, the user may have a different level of expertise. A user may also have varying levels of expertise for different management operations. For example, a user may be an expert at provisioning storage for an email application and be a novice when conducting other management operations related to the email application. Roles and permissions may also be specified for a user. For example, a user may have an administrator role in relation to a system or application. In some embodiments, user level, role, and permission information for users may be obtained from user experience level database 207. User levels, roles, and permissions are described in more detail in U.S. Pat. No. 7,523,231, issued Apr. 21, 2009, which is hereby incorporated by reference herein.

In some embodiments, an event state may represent or be associated with a particular management operation state or states that is tracked by the management operations log 206. The management operations log 206 may track, for example, various management operations that may be used by learning module 200 to determine one or more event states that may be used to help define the situational state space. Example management operations include, without limitation, configuring and provisioning storage in a data storage system for use with a particular application; backing up, moving, reorganizing, protecting, analyzing, modifying, and repairing objects stored within a data storage system; and upgrading software associated with the data storage system. The management operations log 206 may also include information relating to which application or applications are associated with the various management operations as well as performance metrics information collected before, during, and after execution of a management operation that may be associated with one or more applications, management operations, and/or data storage systems. Further, the management operations log 206 may also include information relating to the level of expertise, role, and permissions of users invoking and carrying out management operations. Alternatively, the learning module 200 may infer the level of expertise, role, and permissions of users invoking and carrying out management operations. The inference may be based on the number of occurrences of an operation by a user or based on what operations a user invokes. In some embodiments, the level of expertise, role, and permissions of a user invoking and carrying out a management operation may be obtained from the user experience level database 207. Any information contained within the management operations log 206 may be used or combined with other information to define an event state. For instance, in some embodiments the performance of a particular management operation invoked by an expert user may comprise an event state dimension, or, instead, the level of expertise of the user who invoked the management operation may itself represent a dimension separate from the event state dimension.

Figure 5A:
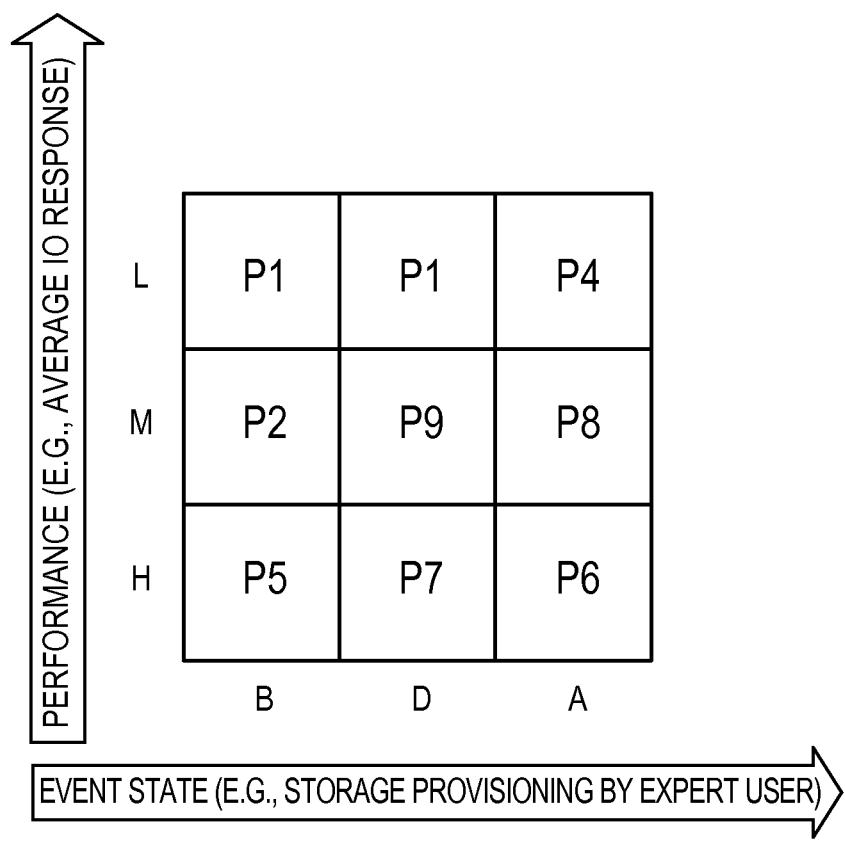
FIG. 5A and FIG. 5B illustrate example situational state spaces that may be used with an embodiment of the technique herein.
Figure 5B:
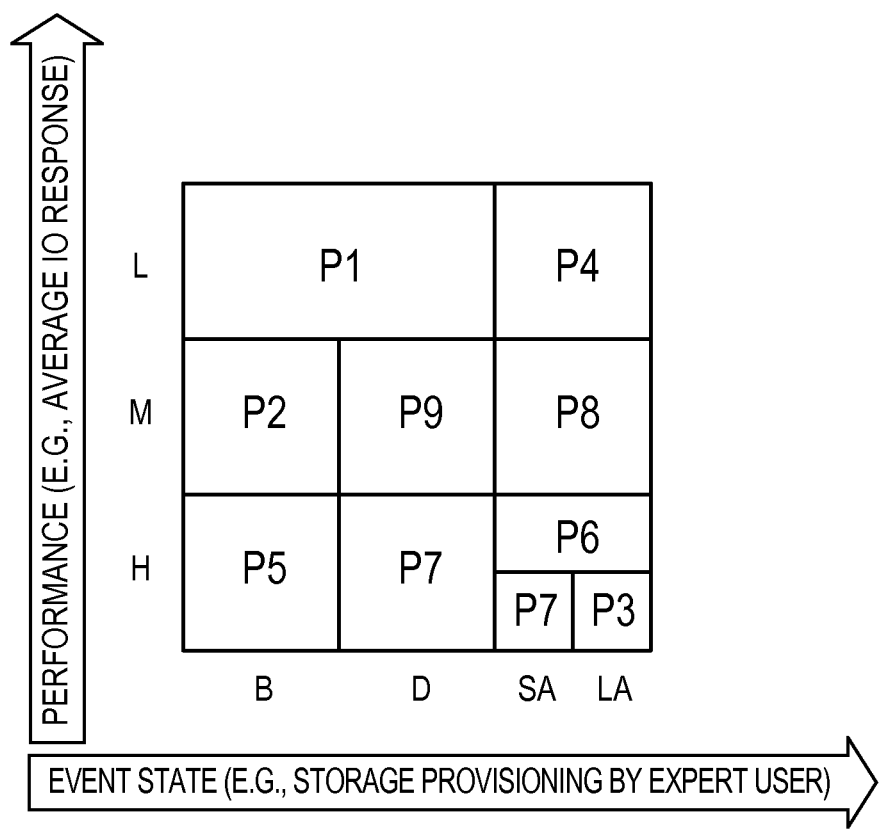

More particular illustrations of exemplary situational state spaces as may be defined in step 400 are shown in FIGS. 5A and 5B. In these state spaces, there are two dimensions, one selected from the event state category and the other selected from the performance category. The event state dimension in FIG. 5A represents the performance of a management operation invoked by a user with a particular user experience level. Specifically, the event state dimension in FIG. 5A represents the performance of a storage provisioning management operation invoked by an expert user with associated temporal ranges of before (B), during (D) and after (A). For example, B may represent a state in which it is known that a storage provisioning management operation has not yet been performed, D may represent a state in which the operation is currently being performed, and A may represent a state in which the operation recently completed. The performance dimension in FIG. 5A and FIG. 5B may be average IO response with ranges of low (L), medium (M) and high (H). As can be seen in the example embodiment of FIG. 5A, the defined state space is initially partitioned into nine states, or situations.

In other embodiments, two or more dimensions may be selected from one or more of the categories. For example, other two dimensional state spaces may comprise two load dimensions or two performance dimensions. As another example, a dimension may represent user experience levels. It is also possible for the defined state space to include only a single dimension, or three or more dimensions.

In step 402, objective functions component 212 can be used to help define and evaluate objective function normalized metrics and their respective weights. Examples of objective function metrics include response time, throughput, predictability, utilization, and metrics collected in the management operations log 206. As a more particular example, the objective function may comprise a weighted sum of two normalized metrics, such as a storage level measure and an application level measure. In this case, a given objective function F may be defined as follows:

$$F=0.40(N1(\text{MB/sec}))+0.60(N2(\text{transactions/sec}))$$

where MB/sec denotes a local or storage level data transfer metric, transactions/second denotes an application level throughput metric, and N1 and N2 denote normalization functions. Of course, numerous other objective functions may be used in an embodiment of the current technique, and the particular metrics and weights can generally vary depending on factors such as, e.g., the aspects of data storage system operation of interest, the type of data storage system, the system configuration, and the applications running on the system. For example, in place of the above-noted application level measure, one could more generally use any potentially optimizable measure outside of the data storage system.

Examples of other performance metrics that may be used in a given objective function 212 include, e.g., input outputs per second (IOPS), average service time (AST), average response time (ART), performance service level objective (SLO) achievement, availability SLO achievement, consistency of input output (IO) response times (i.e., predictability), and utilization.

In step 404, candidate resource management policy sets of policy sets 208 can be identified with respect to the defined state space. Referring to FIG. 5A, the candidate policy sets identified in step 404 include at least nine distinct policy sets denoted P1 through P9. Each of the policy sets may comprise at least first and second policies, with each such policy being specified by at least a value of a particular operating parameter. For example, the first and second policies of a given one of the policy sets may comprise respective values defining respective percentages of a specified resource to be used for the operating parameters.

In step 406, the current situational state of the data storage system 102 is monitored. Generally, as the system operates, its state can change over time. This step monitors the trajectory of system operation over time and determines the current state of operation in the defined state space.

In step 408, a particular one of the candidate policy sets identified in step 404 is selected for testing for use with the current state as determined in step 406. The selected policy set is then deployed and the objective function is subsequently evaluated, as indicated in step 410.

At step 412 it is determined if sufficient statistical information has been obtained across the defined state space. For example, this determination may be based on a value of $\alpha$ indicating a level of statistical significance of differences in objective function values across candidate policy sets. More particularly, a value of $\alpha$ less than a certain value, such as 0.1 corresponding to a 90% level of statistical significance or 0.2 corresponding to an 80% level of statistical significance, may be used to indicate that sufficient statistical information has been obtained. In other embodiments, one or more additional or alternative criteria may be used as a basis for the decision in step 412. If sufficient statistical information has been obtained, the process moves to step 414, and otherwise returns to step 406.

In step 414, an optimal policy set is identified for each state of the defined state space. With reference again to the FIG. 5A example, the candidate policy sets identified in step 404 included at least nine distinct policy sets denoted P1 through P9. After performance of step 412, eight policy sets denoted P1, P2, P4, P5, P6, P7, P8 and P9 are associated with particular ones of the states, with policy set P1 being used for two states and policy set P3 not being used for any state. This step of identifying optimal policy sets may be performed, by way of example, using a process based on Bayesian principles, a Taguchi judgmental sampling process, or other type of known optimization process. Examples of Bayesian optimization techniques are disclosed in W. M. Bolstad, "Introduction to Bayesian Statistics," Second Edition, John Wiley, 2007, ISBN 0-471-27020-2. Examples of Taguchi judgmental sampling techniques are disclosed in N. Logothetis and H. P. Wynn, "Quality Through Design: Experimental Design, Off-line Quality Control, and Taguchi's Contributions," Oxford University Press, Oxford Science Publications, 1989, ISBN 0-19-851993-1; and R. D. Moen, T. W. Nolan & L. P. Provost, "Improving Quality Through Planned Experimentation," 1991, ISBN 0-07-042673-2.

In step 416, a determination is made as to whether or not there is a need to repartition the situational state space. For example, there may be a need to repartition the state space in order to combine multiple states into a single state based on the policy sets associated with these multiple states, or to divide a single state associated with a sensitive area of performance into multiple states for more precision in choosing policy sets. If there is no such need, the process stops as indicated, and otherwise proceeds to step 418. The repartitioning determination in step 416 may be based on satisfaction of predetermined repartitioning criteria.

In step 418, the situational state space is repartitioned, and the availability of sufficient statistical information is again tested in step 420. If there is not sufficient statistical information across the repartitioned state space following the evaluation performed at step 410, the process returns to step 406 to select and deploy policy sets and evaluate the objective function for each such selected and deployed set until sufficient statistical information is available across the repartitioned state space. An optimal policy set is then identified for each state of the repartitioned state space in step 422.

With reference to FIG. 5B, an example of a repartitioned state space is shown. Relative to the state space of FIG. 5A, the repartitioned state space of FIG. 5B has separated the state formerly associated with policy set P6 into three separate states now associated with respective policy sets P3, P6 and P7. Also, the two states formerly associated with policy set P1 in FIG. 5A have been combined into a single state in the repartitioned state space of FIG. 5B. The event state dimension in this example may represent the performance of a storage provisioning management operation by an expert user with associated temporal ranges of before (B), during (D), shortly after (SA), and long after (LA). The repartitioning of the state space in step 418 may be performed using an automated mesh refinement process, although other repartitioning techniques may also or alternatively be used. Examples of automated mesh refinement techniques suitable for use with embodiments of the invention are disclosed in "Theory and Applications: Proceedings of the Chicago Workshop on Adaptive Mesh Refinement Methods," Sep. 3-5, 2003, Series: Lecture Notes in Computational Science and Engineering, Vol. 41, T. Plewa, T. Linde & V. G. Weirs (Eds.), Springer-Verlag, 2005, ISBN 978-3-540-21147-1.

Although not specifically indicated in the FIG. 4A diagram, the repartitioning process may be repeated one or more additional times, each time resulting in a repartitioned state space having optimal policy sets associated with its respective states.

Figure 4B:
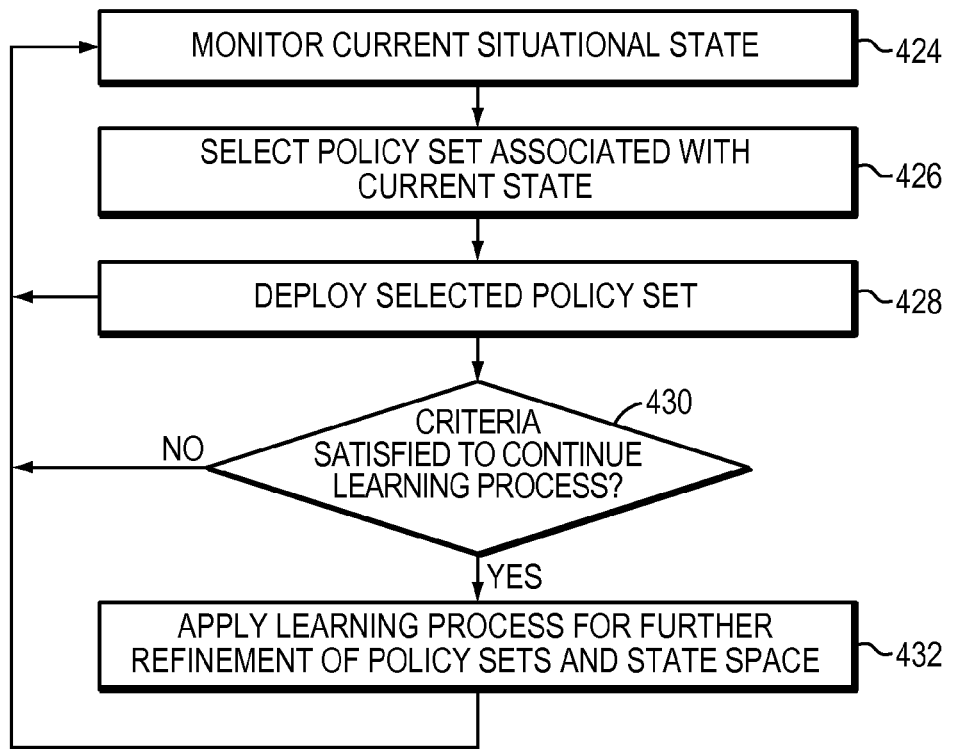

FIG. 4B is a flow diagram illustrating how the production module 202 of the SAF 112 can be used to deploy optimal storage policies in at least one embodiment. In this embodiment, the production process implemented by this module includes steps 424 through 432.

In step 424, the process monitors the current situational state of the system in the defined situational state space maintained by the situational state space component 204. This situational state space may be a repartitioned state space determined through prior use of the learning process of FIG. 4A.

In step 426, a particular policy set is selected from policy sets 208 based on the current state in the state space as determined in step 424.

In step 428, the selected policy set is deployed.

Steps 424 through 428 may be repeated on an ongoing basis, as the system operating point moves within the defined state space. Thus, the process after completing step 428 can return to step 424 for further monitoring. At this time, the process may also enter step 430 as indicated.

In step 430, a determination is made as to whether specified criteria for continuing the learning process have been satisfied. For example, the learning process may be repeated periodically based on expiration of timers, or may be repeated based on other specified system triggers or event occurrences. If these criteria are not satisfied, the process may return to step 424.

In step 432, at least a portion of the learning process of FIG. 4A is applied for further refinement of the policy sets and the state space. Thus, for example, policy sets not previously deemed optimal may be deployed in one or more states of the state space to observe the effects of these policy sets on the objective functions 212. Or, for example, the state space may be subject to further repartitioning and further determination of optimal policy sets for assignment to respective repartitioned states. The learning process may thus continue in the background of the monitoring, selecting and deploying steps 424-428.

Figure 6A:
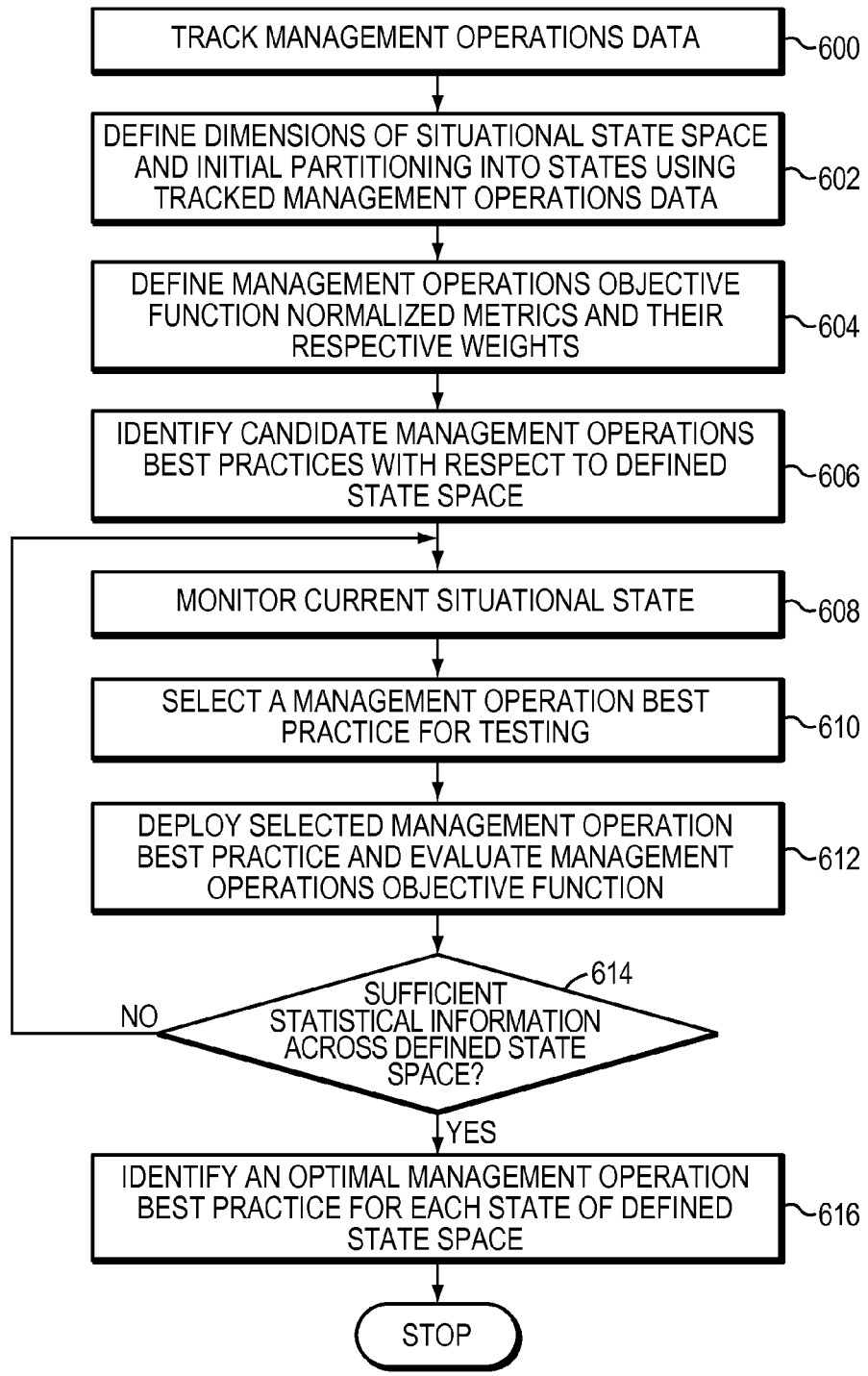

Referring now to FIG. 6A, shown is a flow diagram illustrating how the learning module 200 of the SAF 112 can be used to identify optimal management operations best practices in at least one embodiment. In step 600, management operations data for applications associated with a data storage system can be tracked and possibly stored, for example, in management operations log 206. As described with reference to FIG. 2 above, the management operations log 206 may track various management operations and collect associated data such as, for example, which management operations have been performed, information pertaining to applications associated or unassociated with the performed management operations, when the management operation was performed, and performance data for the management operation, associated or unassociated applications, and/or the data storage system. Management operations log 206 may also track status or outcome data associated with management operations such as, for example, operation completion statuses and error messages. The user level, user role, and user permissions of users invoking management operations may also be tracked in management operations log 206 or obtained from the user experience level database 207.

In step 602, dimensions of a situational state space can be defined for the information management system, including an initial partitioning of the state space into states. The one or more dimensions of the situational state space in an illustrative embodiment may be defined by using the management operations data collected in step 600. For example, a particular management operation being in progress or recently completed midday on a weekday can be a state in a partitioned state space. In this example, the same operation being in progress or recently completed in the evening of a weekday can also be a state in the partitioned state space. Information pertaining to user level, role, or permissions associated with a user conducting a management operation may also be used to help define the dimensions of a situational state space. In some embodiments, this information may be obtained from a user experience level database 207. Depending on the particular embodiment, the defined state space may include only a single dimension, or two or more dimensions.

In step 604, management operations objective functions component 214 can be used to help define and evaluate management operations objective function normalized metrics and their respective weights. The management operations objective function may take into account, e.g., the impact on particular applications associated with the data storage system, the variability of responses and response times of the applications, and the performance or success rates of various management operations. In some embodiments, the management operations objective function may also consider the objective function metrics used for determining optimal data storage system policies as discussed above in conjunction with FIG. 4A (e.g., data storage system performance metrics). In at least one embodiment, the management operations objective function may comprise a weighted sum of two or more normalized metrics. The particular metrics and weights can generally vary depending on the embodiment.

In step 606, candidate management operations best practices can be identified and selected from management operations best practices 210 for each state of the defined state space. Management operations best practices 210 may include, for example, how and when a particular application or management operation should be executed to achieve optimal application, management, and/or system operation performance. In at least one embodiment, the candidate management operations best practices identified and selected may depend on the user level, role, or permissions associated with the user who invoked the relevant management operation. For example, candidate management operations best practices may be refined based on an invoking user's level of expertise, role, or permissions.

In some embodiments, one or more of the management operations best practices may have been predetermined or already recommended or prohibited by administrators or system management policies and procedures. In these embodiments, step 606, as well as steps 608 through 614, may be skipped.

In step 608, the current situational state is monitored. Generally, as the application operates or management operations are requested and performed, the state can change over time. This step monitors the trajectory of system operation over time and determines the current state of operation in the defined state space.

In step 610, a particular one of the candidate management operations best practices identified in step 606 is selected for testing for use with the current state as determined in step 608. The selected management operation is then deployed and the management operation objective function is subsequently evaluated, as indicated in step 612. As with step 606, in at least one embodiment, the selected management operation that is deployed may depend on the user level, role, or permissions associated with the user who invoked the relevant management operation.

In step 614, it is determined if sufficient statistical information has been obtained across the defined state space. If sufficient statistical information has been obtained, the process moves to step 616, and otherwise returns to step 608. If the process moves to step 616, an optimal management operation best practice is identified for each state of the defined state space.

Although not specifically indicated in the FIG. 6A diagram, in some embodiments the defined state space may be repartitioned as described above in conjunction with FIG. 4A. The repartitioning process may also be repeated one or more additional times, each time resulting in a repartitioned state space having optimal management operations best practices associated with its respective states.

Figure 6B:
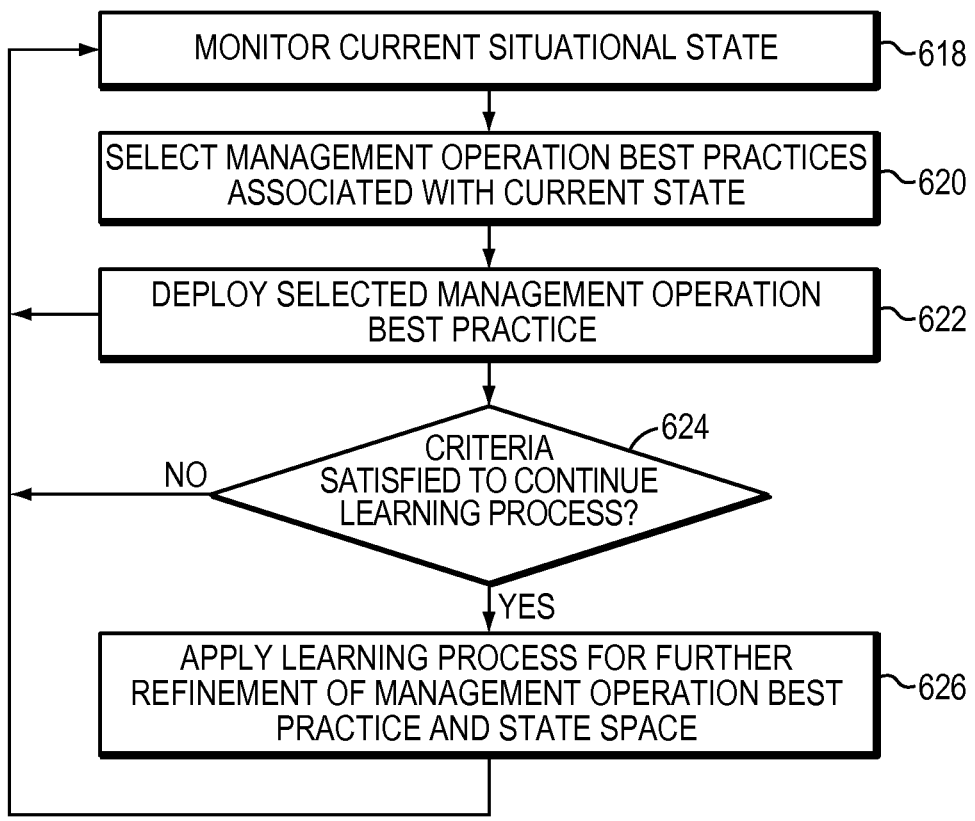

Referring to FIG. 6B, shown is a flow diagram illustrating how the production module 202 of the SAF 112 can be used to deploy optimal management operations best practices in at least one embodiment. The production process implemented by this module includes steps 618 through 626.

In step 618, the current situational state of the system in the defined situational state space is monitored. This situational state space may be a state space determined through prior use of the learning process of FIG. 6A.

In step 620, management operations best practices are selected based on the current state in the state space as determined in step 618.

In step 622, the selected management operations best practices are deployed for the current state.

The deployment of selected management operations best practices may have varying results and varying degrees of impact on an operation or application across different embodiments. In one embodiment, for example, deployment of operations best practices may result in high-impact automated actions. For example, the timing of operations may automatically be set, or particular management operations, management operations features, or application features may be automatically enabled or disabled (e.g., user-selectable options may be invisible or grayed out). As yet another example, best practices may dictate that steps of an operation should be executed at different times. Thus, in at least one embodiment, a selected set of steps may be immediately executed while the remaining, more burdensome steps may be batched for execution at a time when system or application impact will be less severe. Best practices may also result in nested operations such that a current management operation may be temporarily halted to allow for another management operation to be partially or fully performed. For example, performing a data backup operation and a data migration operation contemporaneously may result in system or application performance degradation.

In another embodiment, deployment may result in low-impact application- or operation-specific recommendations such as, for example, a pop-up window recommending which application operations to initiate, when or if certain application operations should or should not be initiated, or suggested settings. In yet another embodiment, deployment may result in notifications to an administrator. For example, an impact analysis message or a best practices departure warning may be conveyed to an administrator.

Steps 618 through 622 may be repeated on an ongoing basis, as the system operating point moves within the defined state space. Thus, the process after completing step 622 can return to step 618 for further monitoring. At this time, the process may also enter step 624 as indicated.

In step 624, a determination is made as to whether specified criteria for continuing the learning process have been satisfied. For example, the learning process may be repeated periodically based on expiration of timers, or may be repeated based on other specified system triggers or event occurrences. If these criteria are not satisfied, the process may return to step 618.

In step 626, at least a portion of the learning process of FIG. 6A is applied for further refinement of the management operations best practices and the state space. Thus, for example, management operations best practices not previously deemed optimal may be deployed in one or more states of the state space to observe the effects of these best practices on the management operations objective function. Or, for example, the state space may be subject to repartitioning and determination of optimal management operations best practices for assignment to respective repartitioned states. The learning process may thus continue in the background of the monitoring, selecting and deploying steps 618-622.

It should be noted that the particular process steps shown in the flow diagrams of FIGS. 4A, 4B, 6A, and 6B are presented by way of illustrative example only, and should not be construed as limiting the scope of the invention in any way.

For example, alternative embodiments could utilize other learning and production processes to associate optimal policy sets or best practices with respective states of a situational state space determined for an information management system, or to deploy these policy sets or best practices. Also, hysteresis or "ping-ponging" among states may be reduced by delaying deployment or redeployment for a specified interval of time.

As another example, alternative embodiments may include rationale logic that may be responsible for determining rationales underlying deployed policies or best practices, as further described below.

In some embodiments, as mentioned above with reference to FIGS. 3A and 3B, the functionalities provided by one or both of the learning module 200 and the production module 202 may be provided as a service, for example, over the Internet. In these embodiments, more than one system may take advantage of the functionalities provided by the service.

Figure 7:
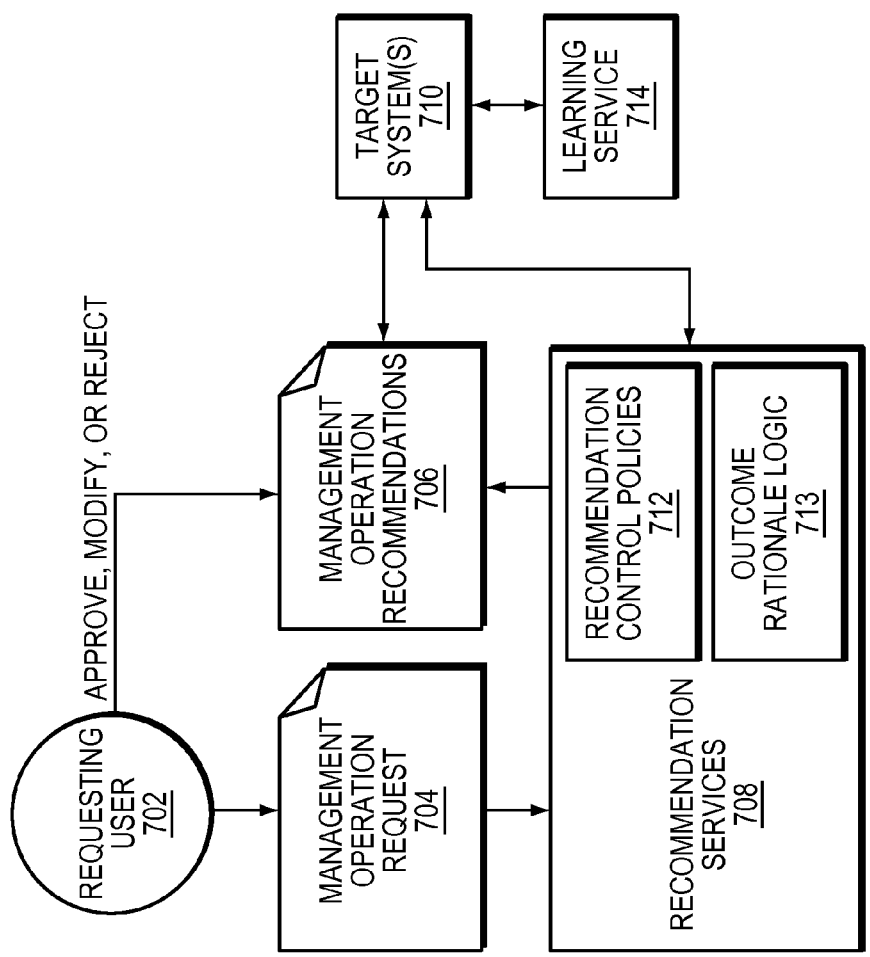
FIG. 7 illustrates the use of a learning service and a recommendation service that may be used with an embodiment of the technique herein.

Referring now to the example embodiment of FIG. 7, production module 202 and one or more of the modules of SAF 112 that are utilized by production module 202 (e.g., situational state space 204, policy sets 208, management operations log 206), may be, be part of, or be utilized by a recommendation service 708. In some embodiments, in addition to the functionalities provided by production module 202 as described above in accordance with FIG. 4A and FIG. 6A, recommendation service 708 may provide management operation recommendations 706 to be applied to a target system 710 to a requesting user 702 based on a generated management operation request 704. Target system 710 may be, for example, data storage system 102 or other systems 308 of FIG. 3A. Depending on the embodiment, the recommendation service 708 may be located within data storage system 102 or, instead, in an environment separately located from data storage system 102, such as within environment 302 of FIG. 3A.

A management operation request 704 may be generated in response to a management operation invoked by an application, system, or a user 702 and may comprise, for example, information pertaining to the operation, the one or more target systems 710 or applications on which the operation will be performed or will affect, when the operation is to be performed, the current state of the target system, and the requesting user's 702 levels of expertise, roles, and permissions, which may be provided by user experience level database 207. In some embodiments, some of this information, such as the target system state, may not be part of the management operation request 704 but instead are determined or obtained by the SAF—for instance, the recommendation service 708 may determine or obtain the information. As a specific example, the requesting user's 702 levels of expertise, roles, and permissions may not be explicitly part of the generated management operation request 704, but instead are determined or obtained by the SAF when determining management operation recommendations 706. Management operation recommendations 706 may specify, for example, one or more recommended operations in addition to or in place of the requested operation, one or more recommended target systems 710 or applications in addition to or in place of the requested one or more target systems on which to perform the one or more requested or recommended operations, a recommended time to execute the one or more requested or recommended operations, recommended steps to be performed by the user 702, system, or application, recommended staging or nesting of steps of the one or more requested or recommended operations, and rationale underlying the operation recommendations. In some embodiments, the recommendation service 708 may present the management operation recommendations 706 to the requesting user 702 or system to be automatically applied to any target systems 710 or applications, or to be approved, modified, or rejected by the user 702 before the management operation recommendations 706 are applied to any target systems 710 or applications.

The rationale underlying the management operation recommendations 706 may be determined in one or more ways with the help of outcome rationale logic 713. For example, a rationale may be determined by an engineer familiar with the system 710 or application, by quality assurance personal during system or application testing, or by the learning module while identifying and selecting best practices. In these examples, outcome rationale logic 713 may be responsible for retrieving the rationale from a data store. In another example, outcome rationale logic 713 may derive the rationale based on, for instance, the management operation request and the recommendation control policies 712.

A rationale may explain why a particular policy or best practice is identified and selected, why a particular recommendation is being made, as well as why a particular operation may be unwise. In an example embodiment, the rationales underlying the policies and best practices may be stored within production module 202 or within the recommendation service 708, and accessed by the outcome rationale logic 713 when determining operation recommendations. Example rationales for a recommendation may include, but are not limited to, the following:

Most systems utilize the recommended best practice.
The management operation may complete in less time using the recommended best practice.
The recommended best practice may ensure that other operations are not hindered.
The recommended best practice may ensure better system performance.
The recommended management operation better accomplishes the desired outcome.
The requested management operation may result in a system error.
The requested management operation cannot be performed by a novice user.
The requested management operation cannot be performed during a data migration operation.

The management operation recommendations 706 may be determined based on one or more policies of recommendation control policies 712. For example, a policy of recommendation control policies 712 may prescribe recommended operations based on the current state of a target system 710 or the requesting user's particular level of expertise. In at least one embodiment, recommendation control policies 712 may be populated by best practices determined by the learning module 200. In other embodiments, recommendation control policies 712 may be predefined by, for example, an engineer.

In some embodiments, the recommendation service 708 may utilize information derived by a learning service 714 or the learning module 200 as well as information provided by the generated management operation request 704 to help formulate management operation recommendations 706 that may be communicated to any target systems 710 and users 702. Depending on the embodiment, the recommendations 706 may be automatically applied to the target systems 710, or a user may approve, modify, or reject the recommendations.

In some embodiments, learning module 200 and one or more of the modules of SAF 112 may be, include, or be utilized by learning service 714. Depending on the embodiment, the learning service 714 may be located within data storage system 102 or, instead, in an environment separately located from data storage system 102, such as within environment 302 of FIG. 3A. In at least one embodiment, target systems 710 may register with the learning service 714; thereby, allowing the systems 710 and the learning service 714 to communicate relevant information continually, periodically, or upon triggering events. In another embodiment, the learning service 714 may be used whenever functionalities provided by the service 714 are desired or needed by any target systems 710 or users 702. In either embodiment, the systems 710 may communicate to the learning service 714, for example, information pertaining to the systems 710 such as hardware and software configurations, user experience level information, information collected in the management operations log, situational dimensions, objective functions, and possible best practices. In some embodiments, some or all of the information may instead be provided by the learning service 714. For example, the learning service 714 may only require management operations log information from target systems 710 to identify and select best practices for target systems 710. In this example, the learning service 714 may utilize its own derived or provided situational dimensions, objective functions, and best practices that, for example, were predetermined during quality assurance testing. Depending on the embodiment, the policies, best practices, any rationales, and other information determined by the learning service 714 may be communicated back to any target system 710 to be utilized by the production module 202 or may instead be retained or communicated to another system for use by the recommendation service 708.

In an example embodiment, information stored in management operations log 206 (e.g., invoked management operations, system performance, user levels associated with invoking users) may be populated with information captured and archived during system quality assurance testing and later downloaded by target systems 710 or, alternatively, made available for later use by recommendation service 708. For example, quality assurance may consist of performing management operations such as provisioning data storage for an application, e.g., an email application, at different times and days, while performing various other operations, from the perspective of a novice, generalist, and expert user, with different cache page sizes, as well as with other various settings, approaches, and combinations of the various settings and approaches. The resulting information may be archived throughout the quality assurance process. The archived information may subsequently be automatically or manually queried using management operation request 704 information to help determine policies, best practices, and recommendations without needing to download the information to a target system. For example, the recommendation service 708 may receive a generated management operation request 704 from a target system 710 or user 702, which recommendation service 708 may evaluate against the archived information to determine, for example, policy or management operations best practices and rationales explaining the determination.

In another embodiment, information such as that collected in management operations log 206 may be uploaded from one or more target systems 710 to a learning service 714. For example, to help determine how best to increase capacity of a target system 710, a user may upload, for instance, days or months worth of information (e.g., system performance information) to a learning service 714, which may analyze the received information to determine policies or best practices across a situational state space related to the target system 710. The resulting best practices may be returned to the target system 710 to be used by a production module 202 or may instead be sent to a recommendation service 708, which may formulate management operation recommendations 706 to be provided to the target system 710 and user 702. The recommendations may suggest, for example, that the system 710 be updated or upgraded, or a best time to deallocate unused storage space. It should be noted that in some embodiments more than one system may upload information to learning service 714. In these embodiments, learning service 714 and production service 708 may utilize the information uploaded by more than one system to help identify and select policies and best practices, determine management operation recommendations, and determine rationales for a target system 710.

Figure 8:
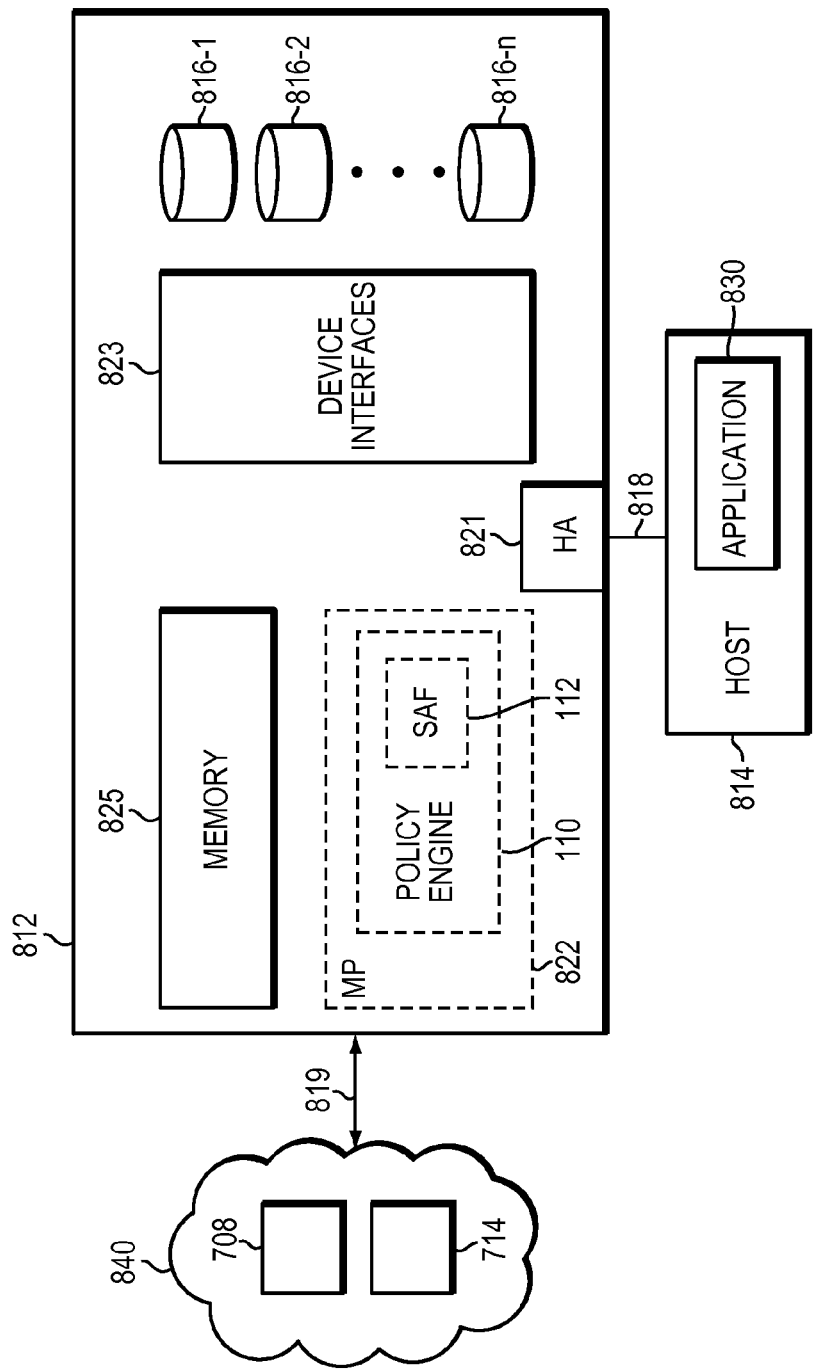
FIG. 8 illustrates one example implementation of the technique herein.

Referring to the example embodiment of an information management system illustrated in FIG. 8, shown is a data storage system 812 in communication with a host 814 and a service provider 840. The data storage system 812 is connected to host 814 through communication medium 818 and to service provider 840 through communication medium 819. In some embodiments, multiple hosts and service providers may communicate with data storage system 812 through communication mediums 818 and 819 respectively or, alternatively, through a separate communication medium. The host 814 may access the data storage system 812, for example, to perform various operations based on a user management operation request. The communication mediums 818 and 819 may be any one or more of a variety of networks or other types of communication connections, such as a network connection, bus or other type of data link, as known to those skilled in the art. For example, the communication mediums 818 and 819 may be the Internet, an intranet, a Storage Area Network (SAN) or any other wired or wireless connection(s) by which the data storage system 812 may communicate with host 814 and service provider 840, and may also communicate with other components included in the system. Communications over the medium 818 and 819 may be in accordance with known protocols, such as, for example, Small Computer System Interface (SCSI), Fibre Channel (FC), Internet SCSI (iSCSI), or TCP/IP.

The host 814, the service provider 840, and data storage system 812 may all be located at the same physical site, or may be located at different physical sites. In an embodiment where more than one host communicates with data storage system 812, each host may perform different types of operations in accordance with different types of tasks. For example, any one of the hosts may issue a data request to the data storage system 812 to perform a data operation. More particularly, an application executing on one of the hosts 814 may perform an operation resulting in one or more data requests to the data storage system 812. In an embodiment where more than one service provider communicates with data storage system 812, each service provider may provide the same or different services.

Although system 812 is illustrated as a single data storage system, such as a single data storage array, element 812 may also represent, for example, multiple data storage arrays alone, or in combination with other data storage devices, systems, appliances, or other components having suitable connectivity, such as in a SAN, in an embodiment using the techniques herein. It should also be noted that an embodiment may include data storage arrays or other components from one or more vendors. For example, the data storage system 812 may be implemented as a Symmetrix® DMX™ data storage array or a CLARiiON® data storage array commercially available from EMC Corporation of Hopkinton, Mass., suitably modified to communicate with service provider 840 and/or to implement the policy engine 110 comprising situational analysis framework 112. However, as will be appreciated by those skilled in the art, the techniques disclosed herein are applicable for use with other data storage arrays by other vendors and with other components than those expressly described herein for purposes of example.

The data storage system 812 may comprise a plurality of data storage devices 816-1 through 816-n, which may be associated with one or more storage arrays. The data storage devices may include one or more different types of data storage devices such as, for example, one or more disk drives, or one or more solid state drives (SSDs). Thus, the storage devices 816 may comprise flash memory devices employing one or more different flash memory technologies. In such an implementation, the data storage devices 816 may include a combination of disk devices and flash devices in which the flash devices may appear as standard FC disk drives to the various software tools used in connection with the data storage array. The disk devices may be any one or more different types of disk devices such as, for example, an advanced technology attachment (ATA) disk drive, FC disk drive, and the like. The flash devices may be constructed using different types of memory technologies such as nonvolatile semiconductor NAND flash memory forming one or more SLC (single level cell) devices or MLC (multi level cell) devices. Flash memory devices and disk devices are two exemplary types of storage devices 816 that may be included in a data storage system used in connection with the techniques described herein.

The host 814 need not directly address the storage devices 816, but instead access to stored data may be provided to one or more hosts from what those hosts view as a plurality of logical units (LUs). The LUs may or may not correspond to the actual physical storage devices 816. For example, one or more LUs may reside on a single physical drive or multiple drives, or on a variety of subsets of multiple drives. Data in a single data storage system, such as a single data storage array, may be accessed by multiple hosts allowing the hosts to share the data residing therein. A map maintained by the data storage system may associate host logical addresses with physical device addresses.

The data storage system 812 in this example embodiment further comprises a host adaptor (HA) 821 coupled to the host 814 via the communication medium 818, device interfaces 823, and memory 825. Depending on the embodiment, data storage system 812 may also have a policy engine 110 and a SAF 112, which may be implemented in an embodiment as software running on a microprocessor 822. The device interfaces 823 may comprise device adaptors and interfaces (e.g., a flash drive interface). The memory 825 may include separate portions for global memory and local memory.

The host 814 may include one or more applications in addition to application 830. Application 830 may be, for example, an email application, a medical office application, or a law office application. The application 830 can communicate with the data storage system 812 when performing management operations (e.g., read, write, configure, provision, upgrade), for example, in response to a user request.

In at least one embodiment, selected policy sets or best practices for controlling the operation of the data storage system 812 based on the current state of the system within a defined situational state space are deployed by the SAF 112 located within the data storage system 812. In another embodiment, this functionality may be provided by service provider 840, which may include one or both of learning service 708 and recommendation service 714 and which may be located within or separately from data storage system 812.

In an example embodiment where application 830 is an email application such as Microsoft® Exchange™, data storage system 812 may communicate information to learning service 708. For example, the information may include management operations that have been invoked, system performance data, and user level data. Learning service 708 may then define a situational state space for data storage system 812 such as that illustrated in FIG. 5A in a manner similar to that described in conjunction with FIG. 4A and FIG. 6A. In some embodiments, the state space may have been predetermined, for example, during quality assurance testing, as described above. In some cases, the defined situational state space may be communicated to data storage system 812. In other cases, the state space may be provided to recommendation service 708.

In the example embodiment where application 830 is an email application, data storage system 812 may communicate a generated management operation request 704 based on a system or user request to recommendation service 708, which may in turn provide management operation recommendations 706 to be applied to data storage system 812. For example, in response to a user request to provision storage for Microsoft® Exchange™, information pertaining to, for example, the provisioning request, the data storage system 812, the application, when the operation is to be performed, and the requesting user's levels of expertise, roles, and permissions may be provided to recommendation service 708 as part of a generated management operation request. In other embodiments, the management operation request 704 may be generated by the recommendation service 708 based on information provided to the recommendation service 708 from the data storage system 812. In some embodiments, this information may be used by recommendation service 708 to determine the current state of the data storage system 812. In another embodiment, some or all of this information may itself represent the current state of the data storage system 812. In the latter embodiment, the current state may be determined by, for example, SAF 112 located within data storage system 812.

Based on recommendation control policies 712 and the communicated information, recommendation service 708 may provide management operation recommendations 706, which may be automatically applied to the data storage system 812 or presented to the user to approve, modify, or reject. For example, recommendation service 708 may recommend that the provisioning operation be performed at a different time, after more storage space is added to data storage system 812, or in stages. In some embodiments, outcome rationale logic 713 of recommendation service 708 may also provide a rationale underlying the provided recommendations or, in the case where a particular best practice or policy is identified and selected, a rationale underlying the identification and selection. For instance, along with a recommendation to perform the provisioning operation at a different time or in stages, a timing rationale may be provided to the user.

Depending on the embodiment, recommendation service 708 may provide recommendations or determine policies or best practices for each state entered by the data storage system 812.

While the invention has been disclosed in connection with preferred embodiments shown and described in detail, their modifications and improvements thereon will become readily apparent to those skilled in the art. Also, it should be noted that although the current technique is described herein with reference to data storage systems and data storage system management operations it should be understood that the principles of the invention are not limited to these system or operations. Rather, they are applicable to any manageable system. For example, the technique described herein may be used with information security management systems, electric utility management systems, and communication management system. Accordingly, the spirit and scope of the present invention should be limited only by the following claims.

What is claimed is:

1. A method for use in providing system management services, the method comprising the steps of:
   receiving, from a requestor, a management operation request at a recommendation service, wherein the management operation request is generated based on a user-invoked management operation pertaining to an operation to be applied to an information management system;
   in response to receiving the request, determining the current state of the information management system;
   based on the current state and recommendation control policies, determining at least one management operation recommendation associated with the information management system, wherein the recommendation control policies form an optimal set of policies for defined states of the information management system with each policy prescribing a management operation recommendation for a particular state of the information management system; and
   providing the management operation recommendations to one of the information management system and the requestor;
   wherein the steps are performed by a processing device of the recommendation service, the processing device comprising a processor coupled to a memory.

2. The method of claim 1, wherein the management operation request comprises information associated with a management operation, the information comprising a management operation type, a time at which the management operation is to be performed, and at least one target information management system.

3. The method of claim 1, wherein the recommendation service comprises a production module.

4. The method of claim 1, wherein the recommendation service is located within the information management system.

5. The method of claim 1, wherein the recommendation service is located separately from the information management system.

6. The method of claim 1, wherein the management operation recommendations comprises at least one recommendation selected from a group of recommendations, the group comprising at least one recommended management operation, at least one recommended time to perform the at least one recommended management operation, a recommended staging of steps of the at least one recommended management operation, and a recommended nesting of the at least one management operation and currently performing management operations.

7. The method of claim 1, further comprising:
   providing a rationale for the management operation recommendations.

8. A method for use in providing system management services, the method comprising the steps of:
   receiving information associated with an information management system at a learning service, wherein the received information comprises management operations data relating to at least one management operation associated with the information management system;
   based on the information, determining dimensions of a situational state space characterizing operating conditions of the information management system, wherein the dimensions characterizing operating conditions are associated with a management operation; and determining best practices for at least one state of the situational state space.

9. The method of claim 8, wherein the dimensions of the situational state space are determined further based on information communicated to the learning service from at least one other information management system.

10. The method of claim 8, wherein the dimensions of the situational state space are determined further based on information gathered during quality assurance testing.

11. The method of claim 8, wherein the best practices are determined based on information communicated to the learning service from at least one other information management system.

12. The method of claim 8, wherein the best practices are determined based on information gathered during quality assurance testing.

13. The method of claim 8, wherein the learning service is located within the information management system.

14. The method of claim 8, wherein the learning service is located separately from the information management system.

15. A system for use in providing system management services, the system comprising:
   a processor comprising a program logic for carrying out the steps of:
   first logic receiving, from a requestor, a management operation request at a recommendation service, wherein the management operation request is generated based on a user-invoked management operation pertaining to an operation to be applied to an information management system;
   in response to receiving the request, second logic determining the current state of the information management system;
   based on the current state and recommendation control policies, third logic determining at least one management operation recommendation associated with the information management system, wherein the recommendation control policies form an optimal set of policies for defined states of the information management system with each policy prescribing a management operation recommendation for a particular state of the information management system; and
   fourth logic providing the management operation recommendations to one of the information management system and the requestor.

16. The system of claim 15, wherein the recommendation service comprises a production module.

17. A system for use in providing system management services, the system comprising:
   a processor comprising a program logic for carrying out the steps of:
   first logic receiving information associated with an information management system at a learning service, wherein the received information comprises management operations data relating to at least one management operation associated with the information management system;
   based on the information, second logic determining dimensions of a situational state space characterizing operating conditions of the information management system, wherein the dimensions characterizing operating conditions are associated with a management operation; and
   third logic determining best practices for at least one state of the situational state space.

18. The system of claim 17, wherein the dimensions of the situational state space are determined further based on information communicated to the learning service from at least one other information management system.

* * * * *